United States Patent [19]

Zingg

[11] 4,354,552

[45] Oct. 19, 1982

[54] SLURRY CONCENTRATOR

[75] Inventor: Warren M. Zingg, Tulsa, Okla.

[73] Assignee: The Dow Chemical Company, Midland, Mich.

[21] Appl. No.: 185,065

[22] Filed: Sep. 8, 1980

[51] Int. Cl.$^3$ ..................... E21B 34/16; E21B 43/267; B01D 21/26

[52] U.S. Cl. ...................................... 166/90; 166/91; 166/280; 166/308; 210/512.1

[58] Field of Search ................. 166/90, 271, 280, 308, 166/309; 55/189, 190, 191, 459 R; 210/512.1

[56] References Cited

U.S. PATENT DOCUMENTS

| | | | |
|---|---|---|---|
| 2,565,343 | 8/1951 | Benham | 210/512.1 |
| 2,767,847 | 10/1956 | Russell et al. | 210/512.1 X |
| 3,034,647 | 5/1962 | Giesse | 210/512.1 X |
| 3,489,680 | 1/1970 | Snavely, Jr. | 210/512.1 X |
| 3,776,385 | 12/1973 | Maciula et al. | 210/512.1 X |
| 3,885,933 | 5/1975 | Putney | 55/459 R X |
| 4,048,067 | 9/1977 | Cheng | 210/512.1 X |
| 4,126,181 | 11/1978 | Black | 166/308 X |

*Primary Examiner*—James A. Leppink
*Assistant Examiner*—George A. Suchfield
*Attorney, Agent, or Firm*—L. W. White

[57] ABSTRACT

A slurry concentrator is described which is particularly useful in concentrating slurries for use in foam fracturing of subterranean earth formations. This slurry concentrator comprises:

a housing having a first end and a second end, the housing defining a bore of generally circular cross section and having an axis of generation extending from the first end to the second end, the housing adjacent the first end defining an entrance passage which is generally tangentically disposed relative to said bore, a hollow cylindrical conduit having a diameter approximating the diameter of the bore which is positioned in a nonrotatable manner within the bore and adjacent the first end of the housing, the conduit having an entrance opening in alignment with said entrance passage, a hollow frustoconical member having a lesser end and a greater end disposed within the bore, the greater end being disposed generally adjacent the first end of the housing and having a diameter approximating the diameter of the bore, the lesser end being disposed generally remote to the first end of the housing, a first end closure affixed to the housing, supporting therein a first discharge conduit which is generally coaxial to the bore and which extends into the bore and into the conduit beyond the entrance passage, but does not extend into the frustoconical member, a second end closure affixed to the housing, supporting therein a second discharge conduit which is generally coaxial to the bore and which is in fluid communication with the lesser end of the frustoconical member, the external surface of the frustoconical member and the adjacent surface of the housing defining a generally annular space, and fluid communication means between the annular space and the space internal to the frustoconical member.

16 Claims, 7 Drawing Figures

SLURRY CONCENTRATOR

BACKGROUND OF THE INVENTION

1. Field of the Invention

This invention pertains to a novel slurry concentrator and methods of use. The apparatus is particularly useful in concentrating an aqueous proppant slurry for hydraulic fracturing of a subterranean earth formation.

2. Description of the Prior Art

A variety of methods have been described in the prior art to stimulate the production of hydrocarbon fluids (e.g. crude oil and natural gas) from wells drilled into reservoirs of low permeability. Matrix acidizing and hydraulic fracturing of such formations are the best known and most widely used techniques. In hydraulic fracturing, a fracturing fluid is pumped through a perforated casing into the hydrocarbon-bearing pay zone under pressure sufficiently high to cause the formation to split or fracture. The fracture fluid normally contains a proppant which is emplaced into the fracture and prevents the formation from closing back upon itself when the pumping pressure is released. The propping agent (e.g. sand, sintered bauxite, glass beads, etc.) provides a permeable channel in the formation through which fluids flow to the well bore and are withdrawn.

In the usual hydraulic fracturing process, various liquids such as crude oil, diesel fuel, kerosene, water, gelled water, acid (aqueous HCl), gelled acid, etc. (with or without propping agents) have been used as the fracturing fluid. Water gelled with a polysaccharide or polysaccharide derivative (e.g. guar, hydroxypropyl guar, etc.) has been a particularly effective fracturing fluid and has been widely used. However, these aqueous gels and other liquid fracturing fluids have problems associated with their use. For example, when the formation breakdown pressure is reached and fracturing occurs, a large pressure drop results. The pumps must then be capable of supplying large volumes of additional fracturing liquid quickly to the fracturing zone in order to maintin and extend the fractures formed. To supply such additional pump pressure requires several large pumping units to be held in reserve which would not otherwise be required. In addition, liquid fracturing fluids often require additional treatment or chemical additives to increase their viscosity, gel strength, and/or to improve their fluid loss properties during use. Further treatment of the liquids have been designed to improve the proppant carrying capabilities of the fluids.

Many of the problems associated with liquid fracturing fluids have been addressed and solved by hydraulic fracturing with foam. Foam fracturing is of relatively recent vintage and the state of the art is represented by Blauer, et al. in U.S. Pat. No. 3,937,283. Other articles of interest in foam fracturing appear in the July 22, 1974 issue of "Oilweek" by Bullen and in the paper presented by Blauer, et al. entitled "Formation Fracturing with Foam" SPE 5003. Reference is also made to Plummer et al., U.S. Pat. No. 3,980,136.

Blauer et al. in U.S. Pat. No. 3,937,283 describe the many advantages of foam fracturing and teach methods of making and using such foams. One of the advantages of foam fracturing is lower fluid loss to the formation. Lower fluid loss means that the fracture treatment is more efficient and that formation damage is minimized. As a further advantage, the foams typically have a relatively high proppant carrying capacity which allows more of the proppant to be delivered to the site of the fracture and this helps eliminate screen-outs during unplanned shut-downs during the fracturing treatment. A "screen-out" is, of course, a term used in the oilfield to define the phenomenon when the proppant precipitates out of the fracturing fluid and plugs up the wellbore. The foams are also easier to pump and require less initial hydraulic horsepower and fewer reserve pumping units at the well site.

Foam fracturing efficiency can be further enhanced by concentrating the proppant slurry before generating the foam. The proppant slurry comprises a foamable liquid and particulate solid proppant. Presently, conventional proppant slurries contain concentrations of from about 6 to about 8 pounds of proppant (e.g. sand) per gallon of carrier fluid; after foaming, the solids content of the slurry is reduced to about 1 or 2 pounds of proppant per gallon of liquid. Since it is at least theoretically possible for the foam to support substantially more proppant than this, a way is needed to increase the slurry density prior to foaming.

Black described one device in U.S. Pat. Nos. 4,176,064 and 4,126,181 to accomplish this result. The slurry concentrator described by Black is a mechanical separator having a rotating impeller that imparts a centrifical force to an incoming slurry which forces the heavier materials to the outside walls and lets the lighter carrier fluid separate from the slurry and flow through a slotted screen out of the concentrator into a reservoir. A commercial embodiment of this concentrator has enjoyed only marginal success due to mechanical problems associated with the rotating parts, seals, etc. In actual practice, such problems have resulted in the operating pressure of the units being usually restricted to a maximum of about 5000 psi (35,000 kPa) and moderate volume throughput. Further information on this system can be found in the paper presented by Anderson et al. (Paper No. 793,039) presented at the 30th annual technical meeting of the Petroleum Society of CIM on May 8-11, 1979, in Banff.

Sales literature by a variety of oil well service companies indicates that other slurry concentrators are being developed for use in foam fracturing.

The disclosures of each of the patents and journal articles referred to above are specifically incorporated herein by reference.

SUMMARY OF THE INVENTION

A novel slurry concentrator has now been discovered which is particularly useful for concentrating proppant slurries for subsequent use in hydraulic foam fracturing of subterranean earth formations. The novel slurry concentrator can be used at elevated pressures (e.g. greater than 10,000 psi), if desired, at a volume throughput sufficient to fracture most formations.

The novel slurry concentrator comprises:

a housing having a first end and a second end, the housing defining a bore of generally circular cross section and having an axis of generation extending from the first end to the second end, the housing adjacent the first end defining an entrance passage which is generally tangentically disposed relative to said bore, a hollow cylindrical conduit having a diameter approximating the diameter of the bore which is positioned in a nonrotable manner within the bore and adjacent the first end of the housing, the conduit having an entrance opening in alignment with said entrance passage, a hollow frustoconical member having a lesser end and a greater end disposed within the bore, the greater end being disposed generally adjacent the first end of the housing and having a diameter approximating the diameter of the bore, the lesser end being disposed generally remote to the first end of the housing, a first end closure affixed to the housing, supporting therein a first discharge conduit which is generally coaxial to the bore and which extends into the bore and into the conduit beyond the entrance passage, but does not extend into the frustoconical member, a second end closure affixed to the housing, supporting therein a second discharge conduit which is generally coaxial to the bore and which is in fluid communication with the lesser end of the frustoconical member, the external surface of the frustoconical member and the adjacent surface of the housing defining a generally annular space, and fluid communication means between the annular space and the space internal to the frustoconical member.

In addition to being a highly productive device for use in the oil field, the novel slurry concentrator can also be used in fields other than fracturing where it is necessary or desirable to concentrate liquid/solid slurries or even to separate liquids of different densities or gases from liquids, etc. under conditions of elevated pressure.

BRIEF DESCRIPTION OF THE DRAWINGS

The embodiments of the slurry concentrator shown by FIGS. 1 and 2 represent the presently preferred embodiments of the invention.

DETAILED DESCRIPTION OF THE INVENTION

Figure 1:
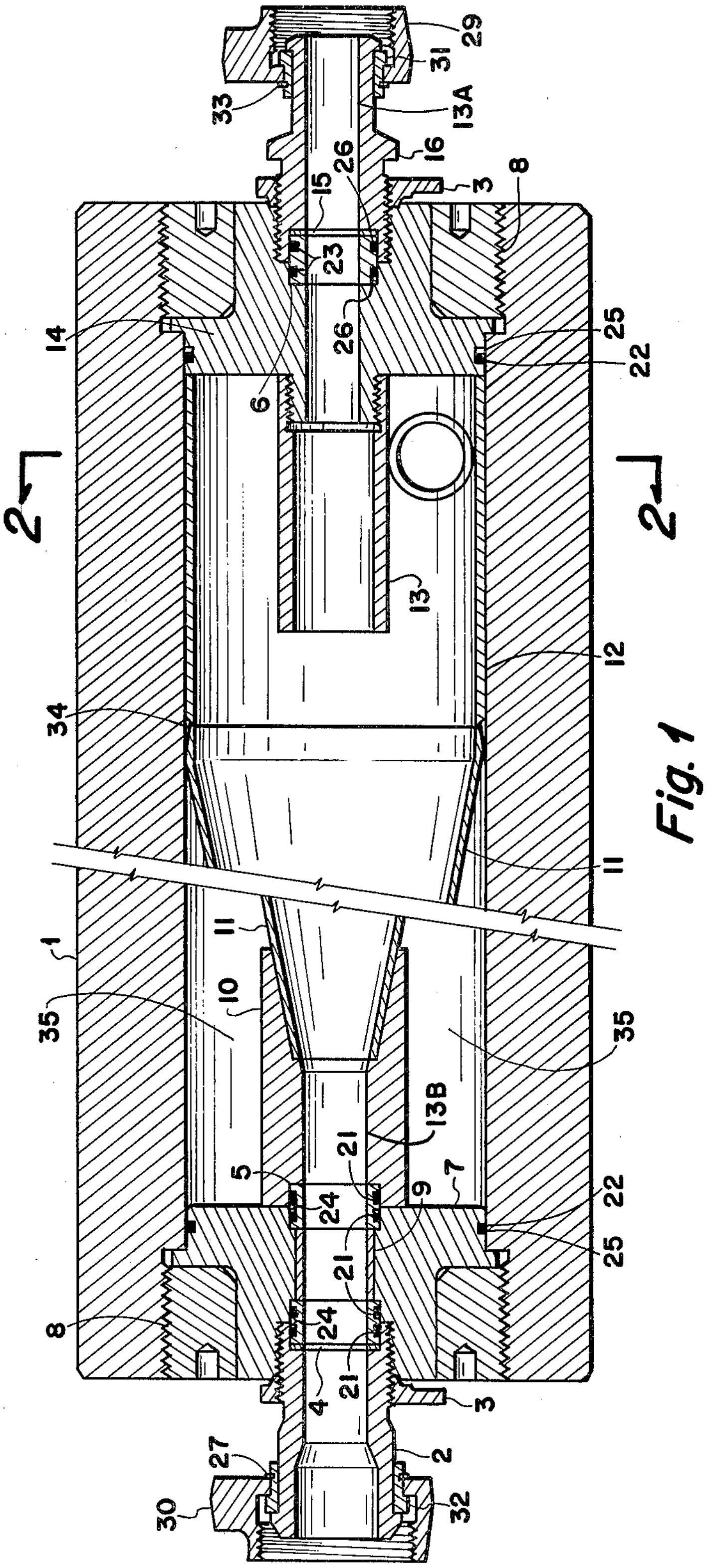
FIG. 1 is side schematic cross-sectional view.

FIG. 1 shows the outer shell or housing (1) of the concentrator having a hollow cylindrical bore generally circular cross section and having an axis of generation extending from end to end. The walls of the housing are capable of withstanding elevated pressure and are normally metal (e.g., steel) but can be of other materials of construction. FIG. 1 also shows a hollow cylindrical conduit (12) positioned within the bore of the housing. The cylindrical conduit has an entrance opening in alignment with an entrance passage or slurry inlet (17) which is oriented generally tangentially to the hollow cylindrical conduit (12). The slurry inlet (17) is shown in more detail in FIG. 2.

FIG. 1 also shows a hollow frustoconical member (11) having a lesser end and a greater end disposed within the bore. The greater end of the cone is disposed generally adjacent the first end of the housing and having a diameter approximating the diameter of the bore. The lesser end of the cone is disposed generally remote to the first end of the housing.

In the embodiment shown in FIG. 1, the frustoconical cone member (11) and the hollow cylindrical conduit (12) are separate items which are merely buttressed together within the bore of the housing. The two could be fixedly attached but there is substantial procedural advantages in having items 11 and 12 as separate members.

FIG. 1 shows a first enclosure (14) affixed to the housing, supporting therein a first discharge conduit (13) and (13A), which is generally coaxial to the bore and which extends into the bore and into the conduit (12) beyond the entrance passage (17), but does not extend into the frustoconical member (11). Items 13 and 13A together form the discharge conduit. Item 13, however, has been referred to as a "vortex finder".

FIG. 1 shows a second enclosure (7) affixed to the housing, supporting therein a second discharge conduit (13B) which is generally coaxial to the bore and which is fluid communication with the lesser end of the frustoconical member (11). In FIG. 1, the enclosure (7) also comprises support means (10) for the lesser end of the frustoconical member.

FIG. 1 also shows the fluid communication means (34) between the generally annular space (35) defined by the external surface of the frustoconical member (11) and the adjacent surface of the housing (1) and the space internal to the frustoconical member (11). The fluid communication means in this Figure comprise a plurality of longitudinal grooves in the greater end of the frustoconical member which provide a series of openings around the perimeter of the junction of the frustoconical member with the hollow cylindrical conduit (12).

Under conditions of use, the fluid communication means permits the slurry concentrator to be used at elevated pressures to concentrate pumpable slurries (i.e., mixtures of solids, liquids, and/or gases of different densities) without undue regard for the capabilities of the hollow cylindrical conduit (12) and/or the frustoconical member (11) to withstand pressure. The fluid communication means results in a pressure equalization between the annular space (35) and the space internal to the frustoconical member (11). This is a very important feature of the novel slurry concentrator because it permits the frustoconical member (in particular) to be constructed of conventional materials of construction or materials of construction which are specifically designed to withstand a high degree of abrasion or corrosion, for example.

The selection of the materials of construction for the slurry concentrator components is within the skill of the art and can be varied to meet the need of the artisan. The dimensions of the slurry concentrator and its components can also be varied by the artisan to meet particular needs (e.g., the wall thickness of the outer shell can be varied depending upon the pressure rating desired if the material of construction is held constant).

The slurry concentrator operates by converting pressure energy into centrifical force by tangentially feeding a pumpable slurry into the slurry concentrator through the slurry inlet (17). The centrifical forces cause the heavier portions of the feed slurry to move outwardly to the inner walls of the hollow cylindrical conduit (12) and then to proceed smoothly from the first end of the housing toward the second end of the housing into the frustoconical cone member (11) along its inner tapering surface in a centrifically accelerating spiral to the lesser end of the frustoconical member (i.e., its apex), and then to discharge through the discharge conduit (13B). The lighter portion(s) of the slurry moves inwardly as a spiralling vortex to the "vortex finder" (13) and is withdrawn through the discharge conduit (13) and (13A).

The pressure equalizing feature of the slurry concentrator operates by the fluid communication means (34) permitting fluids (injected initially or from the feed slurry) to flow from the interior into the annular space (35) and to fill the annular space. After the annular space has been filled, the pressure exerted on the fluid in the annular space will be the same as the pressure on the fluids within the interior of the frustoconical member and the hollow cylindrical conduit. Because of this, the hollow cylindrical conduit in the frustoconical member is exposed to very little, if any, pressure differential between their interior and exterior surfaces.

The slurry concentrator can be used in any field where it is necessary to isolate components of different densities. It can be used, for example, to separate immiscible liquids of different density (e.g., oil and water) but is particularly useful in concentrating slurries that comprise a carrier liquid and particulate solids. It is this last mode that makes the slurry concentrator of particular use in the oil-field to concentrate proppant slurries. In this use in the oilfield, the slurry concentrator is normally positioned in a horizontally extended position and is one mechanical element of a multicomponent system comprising mechanical blenders, pumping means, etc., which shall hereafter be referred to merely as a "system". This embodiment is shown in an example below.

In order for the slurry concentrator to operate most effectively, a pressure differential is established between materials flowing through the vortex finder and associated conduits and the discharge end of the cyclone separator. This pressure differential is conveniently established by having a pressure reducing means (e.g. a choke assembly or flow restricter) in fluid communication with the vortex finder and associated conduits. This pressure reducing means permits only a portion of the fluid passing through the slurry concentrator to be withdrawn and the pressure differential thus established forces the remainder of the slurry being processed through the discharge end. A variety of pressure reducing devices are well known to those skilled in the art and many choke devices are commercially available. A preferred choke assembly, however, is shown in the commonly assigned U.S. patent application by Warren M. Zingg et al. (Attorney Ser. No. 185,087) filed even date herewith. This unique choke assembly splits the portion of carrier fluid withdrawn from the process slurry into two streams. Each of the streams is then directed through a choke adaptor equipped with a choke flow bean or nozzle and subsequently discharged from the flow bean in a manner such that the force of each stream is pitted against the other and the resultant kinetic energy of the streams is zero or substantially zero. In one embodiment of the choke assembly, the discharge streams from the flow beans are diametrically opposed and the discharge stream flow into each other in a counter current fashion. Since the discharge streams are generally equal in velocity and volume, the energy of each is dissipated and leaves the combination of discharged streams at atmospheric pressure. The disclosure of Ser. No. 185,087 is incorporated herein by reference.

Figure 6:
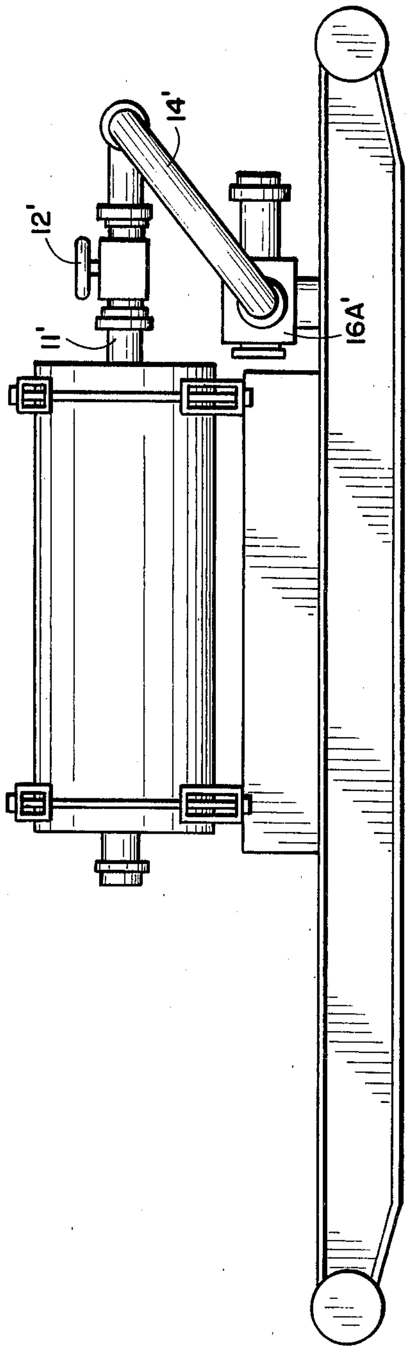
FIGS. 6 and 7 are schematic diagrams of the slurry concentrator having the choke assembly described by Zingg et al. in Ser. No. 185,087 attached.
Figure 7:
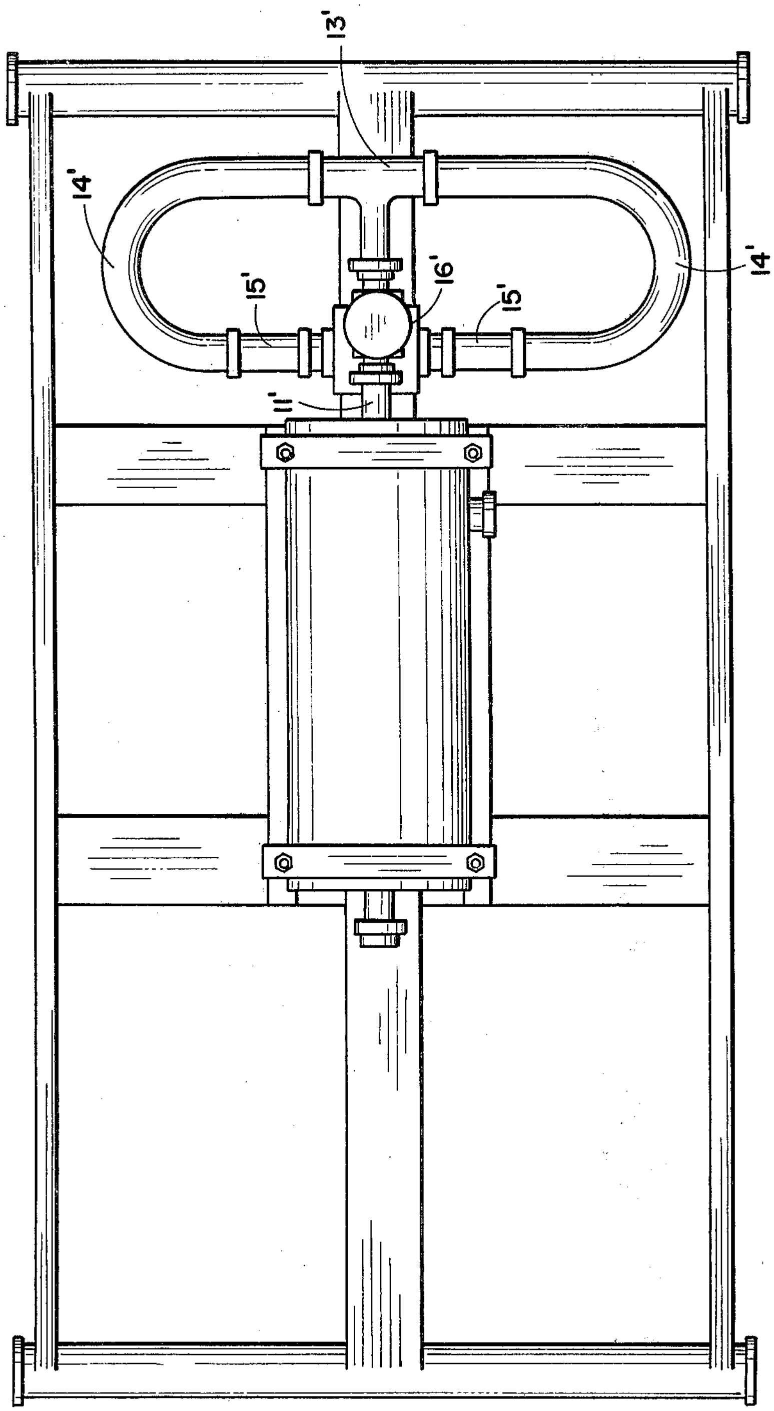

FIGS. 6 and 7, which are discussed below, further illustrate the choke assembly of Zingg et al.

Figure 2:
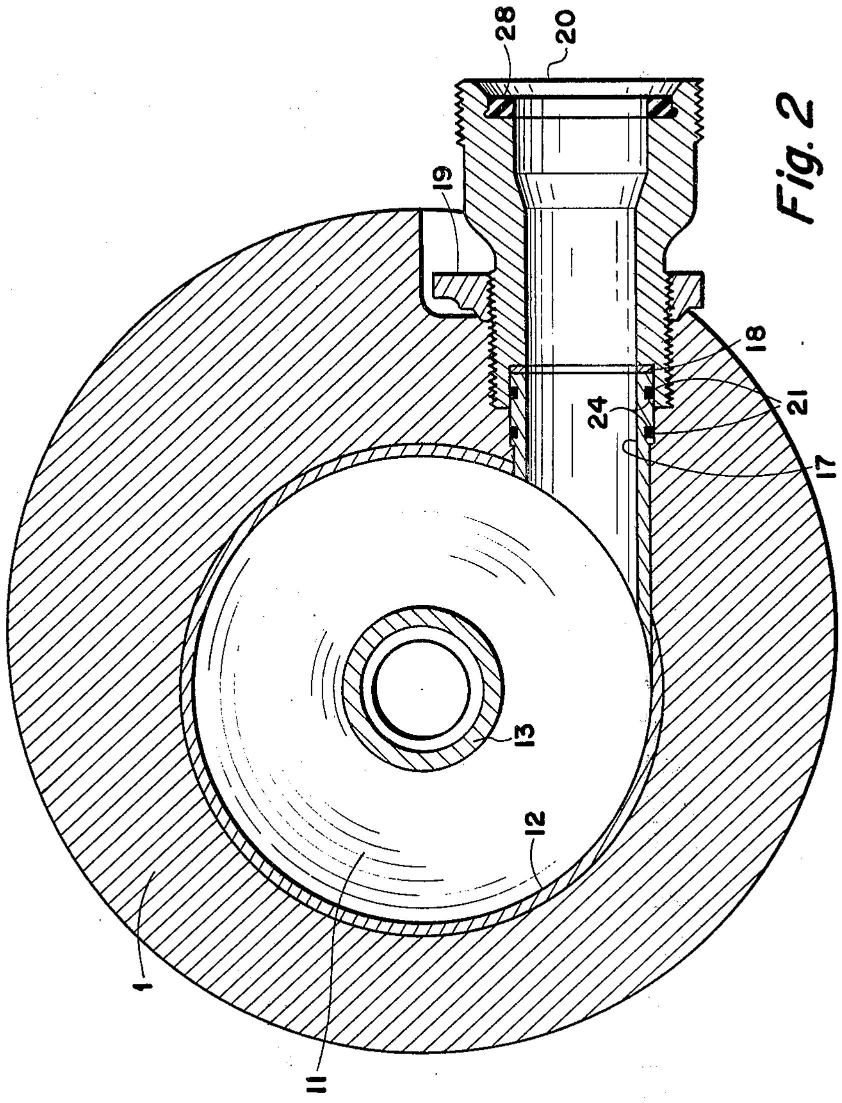
FIG. 2 is an end schematic cross-sectional view along the line 2—2 from FIG. 1.

FIG. 2 shows another unique and preferred embodiment of the invention. Notice in FIG. 2 that the hollow core within the outer shell is off-center. This permits the coupling of the slurry inlet (17) and a conventional adaptor for pressure tubing to be made within the walls of the outer shell. The pressure on the junction is then confined within the outer wall and results in a safer and more secure coupling. In an apparatus operating under the extreme pressures that this slurry concentrator is normally exposed to, this safety feature is not only unique and easy to use but is of paramount importance to the operating personnel. Similarly, it will be observed in FIG. 1 that the junction of the discharge conduits and conventional pressure nipples is made within the confines of the walls of the outer shell. As noted before, the walls of the outer shell are designed to withstand substantially elevated pressures and this discharge junction is also deemed to be a safety feature of the preferred embodiment.

Turning now to a catalog of item numbers in FIGS. 1 and 2:

| Item | Description |
|---|---|
| 1 | Outer shell (housing) of the slurry concentrator; steel walls capable of retaining greater than 22,500 psig. |
| 2 | Adaptor with 2.5 inch bore. |
| 3 | Nut, wing discharge port. |
| 4 | Spacer, bushing with 2.5 inch inside diameter. |
| 5 | Bushing, slurry outlet. |
| 6 | Bushing, discharge port. |
| 7 | Head outlet. |
| 8 | Nut. |
| 9 | Sleeve for outlet head. |
| 10 | Adaptor for small end of cone to re-enforce the cone at points of maximum pressure. |
| 11 | Truncated cone (frustoconical member) 3 1/16 inch diameter at the small end and 10½ inch diameter at the large end with a length of 21 inches. |
| 12 | Hollow cylindrical conduit (separation chamber) having 10 inch inside diameter and 12 inches in length. |
| 13 | Vortex finder, 3 inch inside diameter, 9 inches length. |
| 14 | Outlet recycle head. |
| 15 | Spacer bushing. |
| 16 | Adaptor. |
| 17 | Slurry inlet. |
| 18 | Spacer bushing. |
| 19 | Discharge port wing nut. |
| 20 | Adaptor. |
| 21 | An O-ring seal. |
| 22 | An O-ring seal. |
| 23 | An O-ring seal. |
| 24 | Back-up ring. |
| 25 | Back-up ring. |
| 26 | Back-up ring. |
| 27 | Retaining ring. |
| 28 | Seal ring. |
| 29 | Union nut. |
| 30 | Union nut. |
| 31 | Retainer |
| 32 | Retainer. |
| 33 | Retainer |
| 34 | Groves in truncated cone. |
| 35 | Annular "void" space. |

Figure 3:
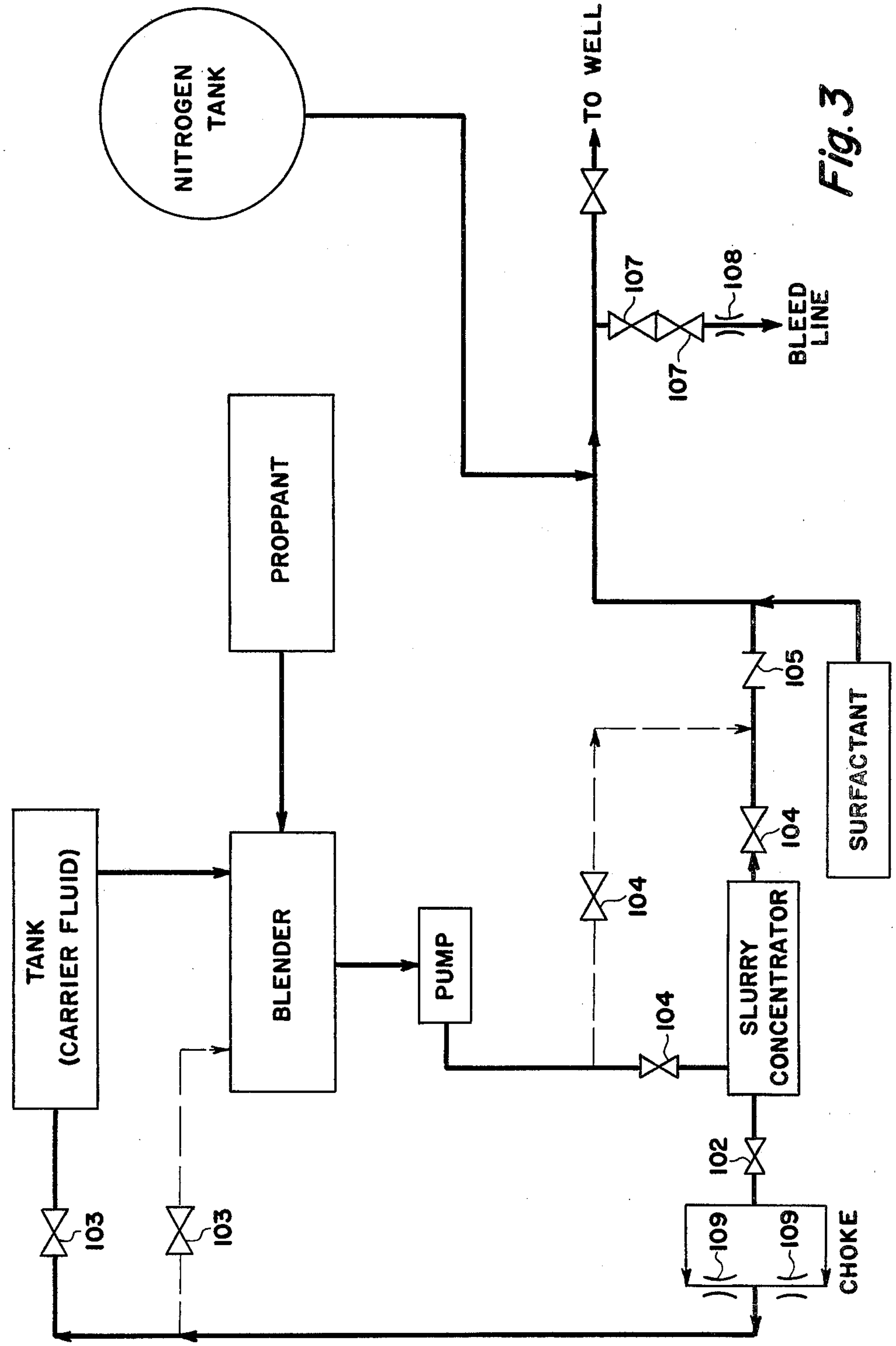
FIG. 3 is schematic diagram of a system used for creating and injecting foam into a well.

FIG. 3 is a schematic diagram of a system used for creating and injecting foam into a well. In FIG. 3, the items marked 102, 103, 104, 105 107 are valves. The items marked 108 and 109 are chokes containing a flow bean.

Figure 4:
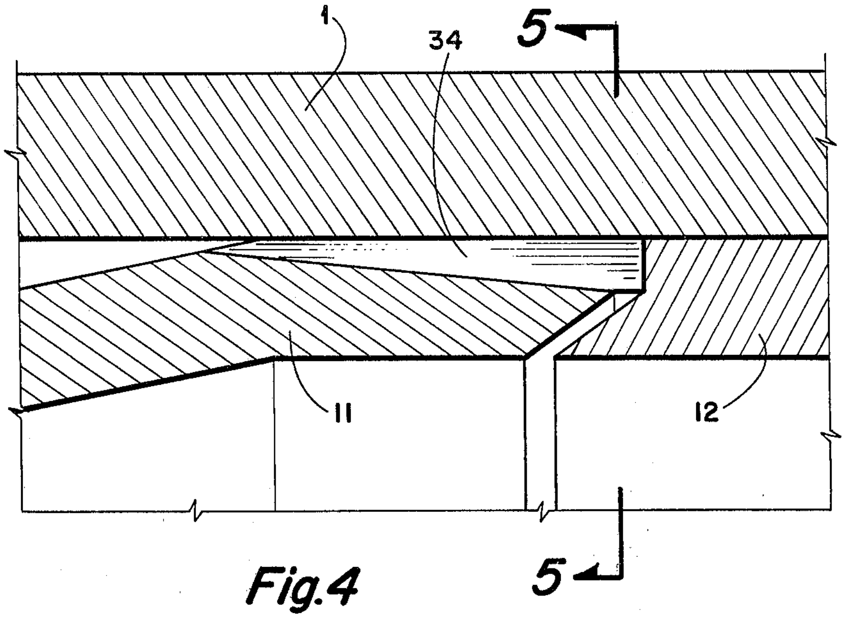
FIGS. 4 and 5 show details of a preferred fluid communication means.
Figure 5:
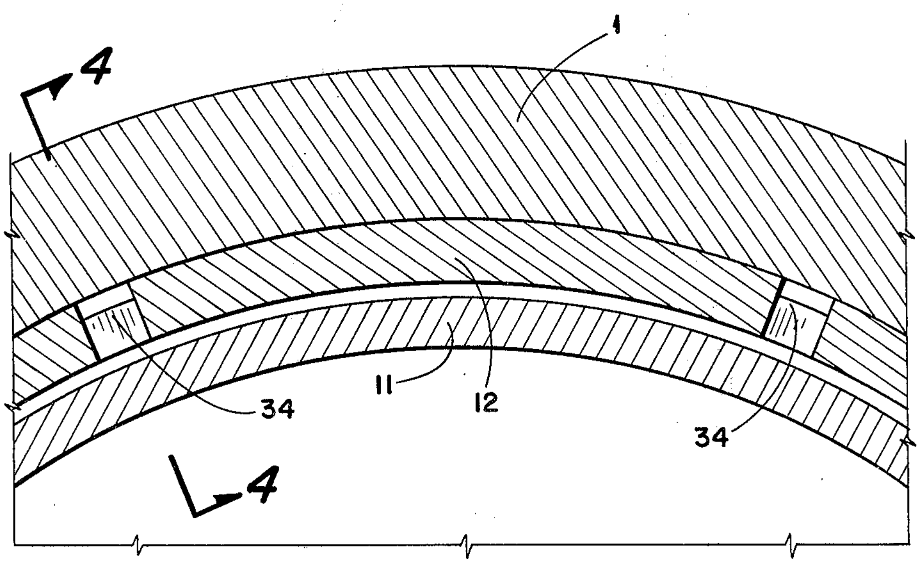

FIGS. 4 and 5 show details of a preferred fluid communication means. The numbered items in FIGS. 4 and 5 have the aforesaid meaning.

FIGS. 6 and 7 are schematics showing the choke assembly described by Zingg et al. in Ser. No. 185,087 attached to the slurry concentrator. These figures show the choke assembly as a loop-shaped device comprising (a) a source of high pressure fluid (11') which is in fluid communication with a conduit containing a valve (12'); which is preferably, a remotely controlled hydraulically actuated valve (e.g., a gate valve), which regulates the flow of fluids through said conduit) and which discharges into (c) a diverting means (13) for dividing the high pressure fluid into two generally equal streams which flow into (d) separate conduit means (14') directing each of the equal streams into (e) one of two pressure control devices having orifices which are positioned in-line (i.e., coaxially) and directly opposite each other (i.e., diametrically opposed) and which are designed to deliver jet streams of fluid of substantial equal force to a common in-line focal point which is (f) enclosed in a container (16') from which the fluid is collected and withdrawn at about atmospheric pressure. The pressure control devices (17') are normally contained within a choke nipple (15') by use of a choke adaptor (16'). These pressure control devices are alternatively referred to in the industry as "choke flow beans".

There are many such pressure control devices containing orifices which are known and which can be adapted for use herein by the skilled artisan. However, the choke flow bean described by Warren M. Zingg in a commonly owned, copending patent application submitted even date herewith entitled "Choke Flow-Bean", Ser. No. 185,061, is preferred; the disclosure of which is incorporated herein by reference.

The choke assembly can be varied in size to convenience and it has been readily adapted as an integral part of a mobile slurry concentrator.

Likewise, the materials of construction can be varied to convenience so long as due regard is given to the pressure limitations to which the particular apparatus will be exposed. Steel is the most conventional material of construction and is, therefore, normally used.

The following example will further illustrate the invention:

The slurry concentrator illustrated by FIGS. 1 and 2 was used in a fracturing system as shown in FIG. 3 in a foam fracturing treatment of a well located in the Luling Branyon Field in Guadalupe County, Tex. The well was approximately 2,000 feet deep and it had a bottom hole static pressure of 700 psi and a permeability of 0.21 millidarcies (average).

In this treatment, 5,000 gallons (gal.) of carrier fluid (2% KCl brine gelled with a commercial polymeric gelling agent, Dowell J312 (20 pounds (lbs.) per 1,000 gal. brine) and 5,000 gal. of carrier fluid were blended with 5,000 lbs. of 100 mesh sand and then 2,500 gallons of carrier fluid were sequentially pumped through the slurry concentrator with the choke assembly valved off so that no liquid was removed from the fluids passing through at a rate of 20 barrels per minute (bpm); a blend of commercial surfactants (Dowell F78 (3 parts by weight) and Dowell F75N (2 parts by weight)) was added at rate of 0.5 bpm, and the fluids were then foamed with gaseous nitrogen (13 bpm, liquid basis) to give a foam quality of 65 (i.e. a Mitchell value of 65) and injected into the well. The valve on the choke assembly was then opened and a slurry of carrier fluid blended with increasing amounts 20–40 mesh sand was then pumped through the system (20 bpm) concentrated and foamed using the same blend of surfactants and nitrogen at the same rates shown above. The slurry was blended at a concentration designed to give 1 lb. sand/gal. of liquid in the foam initially and then to rise steadily to a final concentration of 5–6 lbs. sand/gal. of liquid in the foam over a short period of time (e.g. 3–4 minutes). This schedule was easily achieved. The slurry going into the concentrator thus varied from an absolute density of about 9.4 to about 13.1 lbs./gal. and the slurry discharged from the concentrator had an absolute density that varied correspondingly from about 9.9 to about 14.6 lbs./gal. These data are correlated in Table 1.

TABLE I

| Proppant Conc. (lbs/gal. of fluid) | | |
|---|---|---|
| Initial Slurry | Discharge Slurry | Foam |
| 9.4 | 9.9 | 1 |
| 10.4 | 11.1 | 2 |
| 11.0 | 12.2 | 3 |
| 16.6 | 13.0 | 4 |
| 12.2 | 13.7 | 5 |
| 13.1 | 14.6 | 6+ |

To illustrate the data in another way commonly used in the field, 12.2 and 13.7 lbs./gal. absolute density correspond to 8.8 and 14.3 lbs. of sand added per gallon of fluid, respectively. Without the slurry concentrator and the dynamics of the system, it would generally be thought impossible, for example, for 1 gallon of this carrier fluid to hold 14.3 lbs. of sand, much less than 18.5 lbs. which was achieved during the course of this fracturing treatment. In total, 235,000 lbs. of proppant were emplaced using 89,000 gals. of carrier fluid and 647,369 standard cubic feet of nitrogen. The well was shut in for a period and brought back slowly, according to standard procedures. The fracture treatment was extremely successful according to initial production data.

The slurry concentrator used in the above example has been similarly used in other fracturing treatments where the slurry has been pressurized at over 10,000 psig. These treatments were likewise successful and the slurry concentrator performed very well.

What is claimed is:

1. A slurry concentrator comprising:

a housing having a first end and a second end, the housing defining a bore of generally circular cross section and having an axis of generation extending from the first end to the second end, the housing adjacent the first end defining an entrance passage which is generally tangentically disposed relative to said bore, a hollow cylindrical conduit having a diameter approximating the diameter of the bore which is positioned in a nonrotable manner within the bore and adjacent the first end of the housing, the conduit having an entrance opening in alignment with said entrance passage, a hollow frustoconical member having a lesser end and a greater end disposed within the bore, the greater end being disposed generally adjacent the first end of the housing and said hollow cylindrical conduit and having a diameter approximating the diameter of the bore, the lesser end being disposed generally remote to the first end of the housing, a first end closure affixed to the housing, supporting therein a first discharge conduit which is generally coaxial to the bore and which extends into the bore and into the conduit beyond the entrance passage, but does not extend into the frustoconical member, a second end closure affixed to the housing, supporting therein a second discharge conduit which is generally coaxial to the bore and which is in fluid communication with the lesser end of the frustoconical member, the external surface of the frustoconical member and the adjacent surface of the housing defining a generally annular space, and fluid communication means between the annular space and the space internal to the frustoconical member.

2. The slurry concentrator defined by claim 1 wherein the housing is capable of withstanding a pressure of at least about 10,000 psi within the bore.

3. The slurry concentrator defined by claim 1 wherein the fluid communication means between the annular space and the space internal to the frustoconical member is located essentially at the junction of the hollow cylindrical conduit and the greater end of the frustoconical member.

4. The slurry concentrator defined by claim 3 wherein said fluid communication means comprises a plurality of longitudinal grooves disposed toward the greater end of the frustoconical member which provides a series of openings around its perimeter.

5. The slurry concentrator defined by claim 1 wherein said second end closure additionally comprises support means for the lesser end of the frustoconical member.

6. The slurry concentrator defined by claim 1 wherein the housing is horizontally disposed.

7. The slurry concentrator defined by claim 1 additionally comprising a pressure reducing means in fluid communication with said first discharge conduit.

8. The slurry concentrator defined by claim 7 wherein said pressure reducing means comprises:

(a) means in fluid communication with first discharge conduit for receiving and splitting a first stream flowing therethrough into two substantially equal side streams, (b) conduit means in fluid communication with (a) for directing each side stream to one of two choke flow beans, (c) said choke flow beans being coaxially aligned and diametrically opposed so that jet streams of fluids passing therethrough are substantially equal and meet at a common focal point.

9. The slurry concentrator defined by claim 1 wherein said housing is horizontally extended.

10. A system for producing a slurry of increased density comprising:

(a) blending means for blending a carrier liquid with a proppant to form a first slurry, (b) high pressure pumping means for pumping said first slurry into, (c) the slurry concentrator defined by claim 1.

11. The system defined by claim 10 wherein said system additionally comprises means for recycling a carrier fluid withdrawn through said first discharge conduit to a reservoir for said carrier fluid or to said blending means.

12. The system defined by claim 11 wherein the housing of said slurry concentrator is horizontally extended.

13. A system for treating a subterranean earth formation penetrated by a wellbore with a pressurized foam comprising:

(a) blending means for blending a carrier fluid with a proppant to form a first slurry, (b) high pressure pumping means for pumping said first slurry into a horizontally extended slurry concentrator defined by claim 1 through its slurry inlet at a rate and pressure such that a portion of said carrier liquid is separated from said slurry and withdrawn and a second slurry of increased density is discharged at matrix or fracturing pressure, (c) means for forming a pressurized foam having a Mitchell quality of from about 0.6 to about 0.9 by blending a surfactant and a gas with said second slurry, and (d) means for injecting said pressurized foam into said wellbore.

14. The system defined by claim 13 wherein said proppant is sand, sintered bauxite, resin-coated sand, and/or glass beads.

15. The system defined by claim 14 wherein said gas is nitrogen wherein the discharge pressure of said second slurry is at least about 10,000 psig.

16. The system defined by claim 15 wherein said proppant is sand and/or sintered bauxite.

* * * * *